United States Patent
Brück et al.

(10) Patent No.: US 6,656,435 B1
(45) Date of Patent: Dec. 2, 2003

(54) HONEYCOMB BODY WITH ADSORBER MATERIAL, IN PARTICULAR, FOR A HYDROCARBON TRAP

(75) Inventors: Rolf Brück, Bergisch Gladbach (DE); Peter Hirth, Lohmar (DE)

(73) Assignee: Emitec Gesellschaft fuer Emissionstechnologie mbH, Lohmar (DE)

(*) Notice: Subject to any disclaimer, the term of this patent is extended or adjusted under 35 U.S.C. 154(b) by 596 days.

(21) Appl. No.: 09/677,325

(22) Filed: Sep. 29, 2000

Related U.S. Application Data

(63) Continuation of application No. PCT/EP99/01923, filed on Mar. 22, 1999.

(30) Foreign Application Priority Data

Mar. 30, 1998 (DE) .......................... 198 14 132

(51) Int. Cl.[7] .......................... B01D 53/72; F01N 3/08; F01N 3/28
(52) U.S. Cl. .......................... 422/180; 422/171; 422/177
(58) Field of Search .................. 422/171, 177, 422/180, 211, 222

(56) References Cited

U.S. PATENT DOCUMENTS

| | | | |
|---|---|---|---|
| 5,316,991 A | 5/1994 | Subramanian et al. | 502/65 |
| 5,455,012 A | * 10/1995 | Machida et al. | 422/180 |

FOREIGN PATENT DOCUMENTS

| | | | |
|---|---|---|---|
| DE | 195 02 345 A1 | 8/1995 | |
| EP | 0 424 966 A1 | 5/1991 | |
| EP | 0 622 530 A1 | 11/1994 | |
| EP | 0 582 971 B1 | 11/1997 | |
| JP | 07213910 A | 8/1995 | |
| JP | 07232082 A | 9/1995 | |
| JP | 08168680 A | 7/1996 | |
| JP | 08257365 A | 10/1996 | |
| JP | 09192503 A | 7/1997 | |

OTHER PUBLICATIONS

Werner Kast: "Adsorption aus der Gasphase", [adsoprtion from the gas phase], VCH Verlagsgesellschaft mbH, Weinheim, Germany, 1988, pp. 15–18.

* cited by examiner

Primary Examiner—Hien Tran
(74) Attorney, Agent, or Firm—Laurence A. Greenberg; Werner H. Stemer; Gregory L. Mayback

(57) ABSTRACT

A honeycomb body includes separating walls defining channels for channelling a gas, and an adsorber material disposed on at least part of the separating walls. The inner cross-section and number of channels define a specific geometric surface area (GSA) of the honeycomb body, and they are at least partially separated from one another by separating walls. The material and thickness of the walls define a specific heat capacity with regard to the geometric unit area. The honeycomb body has an adsorption material provided especially for hydrocarbon adsorption. The specific GSA of the body is greater than or equal to 37.5 m K/J, preferably, $\geq 40$, and, particularly, $>60$, the GSA being divided by the specific heat capacity (cp) with regard to the area, measured at room temperature without absorption material and eventual other coatings. The body can additionally have a catalytically active coating that, at least, is oxidative. The body is preferably constructed of sheet metal layers having a thickness of $\leq 40$ $\mu$m with more than 450 cpsi, especially more than 540 cpsi. A hydrocarbon trap of such dimensions can be used for the purification of motor vehicle exhaust gases to reduce the emission of pollutants during the cold-start phase.

17 Claims, 1 Drawing Sheet

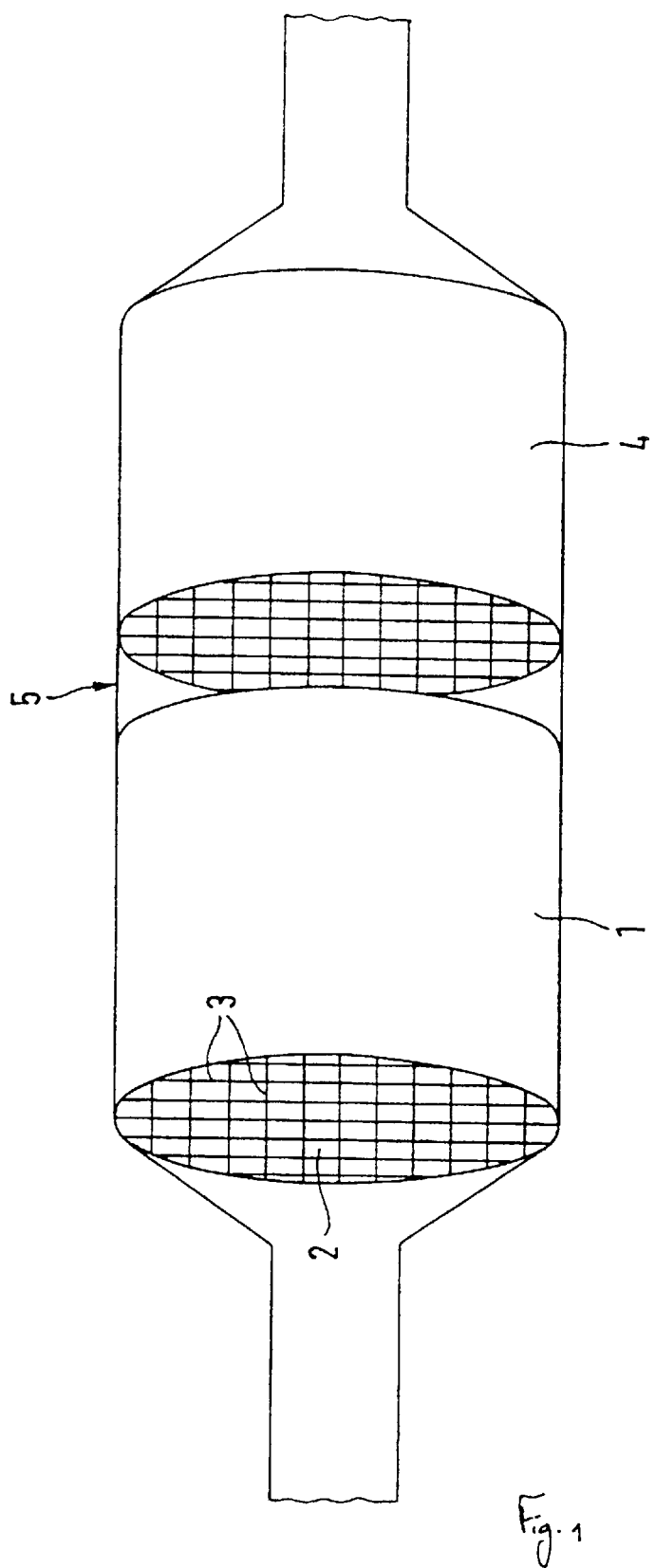

HONEYCOMB BODY WITH ADSORBER MATERIAL, IN PARTICULAR, FOR A HYDROCARBON TRAP

CROSS-REFERENCE TO RELATED APPLICATION

This application is a continuation of copending International Application No. PCT/EP99/01923, filed Mar. 22, 1999, which designated the United States.

BACKGROUND OF THE INVENTION

FIELD OF THE INVENTION

The invention lies in the field of honeycomb bodies. The present invention relates to a honeycomb body with adsorber material, in particular, for a hydrocarbon trap (HC trap), preferably in an exhaust emission control system of a motor vehicle.

As emission control requirements that motor vehicles have to meet become increasingly more stringent worldwide, particular attention is being paid to cleaning the exhaust gas in the cold-starting phase of an internal combustion engine. The reason for the emphasis is that relatively large quantities of unburned hydrocarbons are present in the exhaust gas immediately after an internal combustion engine is started, while, at the same time, catalytic converters in the exhaust emission control system are not yet at a sufficiently high temperature for the catalytic conversion of these hydrocarbons. One solution for reducing the emission of hydrocarbons, in particular, during the cold-starting phase of an internal combustion engine, is the use of an HC trap. An HC trap is generally a honeycomb body with channels through which a gas can pass. Separating walls separate the channels at least partly from one another. The honeycomb body is coated with an adsorber material, preferably zeolite, which adsorbs hydrocarbons at a low temperature and desorbs them again at a higher temperature. Typically, such HC traps are disposed upstream of a catalytic converter in an exhaust flow direction. An example of such a converter is disclosed, for example, from European Patent 0 582 971 B1. European Patent Application 0 424 966 A1 also describes such a system, with the HC trap additionally being bridged at the end of the cold-starting phase by a bypass line in order to avoid overheating in continuous operation. What is described here may also be of significance in the case of adsorbers for other constituents of the exhaust gas, for example, nitrogen oxides or water.

All previous concepts for the construction and configuration of an HC trap allowed for the fact that scarcely any adsorber materials existed that were durable on a long-term basis in an exhaust system of an internal combustion engine, while, at the same time, that had a desorption temperature lying above the minimum temperature necessary for a catalytic conversion of hydrocarbons. Accordingly, previous concepts assumed that an HC trap should have a high specific thermal capacity, in particular, a higher thermal capacity than a downstream catalytic reactor, so that the catalytic reactor could heat up to the minimum temperature necessary for the catalytic reaction before initiation of desorption in the HC trap. The concept is described, in particular, also by European Patent 0 582 971 B1.

In spite of this, a problem remains that the HC trap draws heat from the exhaust gas in the cold-starting phase and, as a result, delays the time taken by a downstream catalytic converter to reach the minimum temperature necessary for the catalytic reaction. The delay made it always difficult to find a compromise for dimensioning an HC trap and a downstream catalytic converter.

SUMMARY OF THE INVENTION

It is accordingly an object of the invention to provide a honeycomb body with adsorber material, in particular, for a hydrocarbon trap, that overcomes the hereinafore-mentioned disadvantages of the heretofore-known devices of this general type and that provides a honeycomb body with adsorber material, in particular, for hydrocarbons, which permits improved cleaning of the exhaust gas of an internal combustion engine, in particular, in the cold-starting phase.

With the foregoing and other objects in view, there is provided, in accordance with the invention, a honeycomb body, including separating walls defining channels for channelling a gas, and an adsorber material disposed on at least part of the separating walls, the separating walls being made from a material and having a thickness, the material and the thickness of the separating walls defining a specific thermal capacity in relation to a unit of surface area, the channels having an inner cross-sectional shape and being separated at least partly from one another by the separating walls, the inner cross-sectional shape and a number of the channels defining a specific geometrical surface area, measured in square meters per liter ($m^2/l$), of a honeycomb body, the geometrical surface area divided by a surface-area-related specific thermal capacity, measured in kilojoules per Kelvin per square meter ($kJ/(K \cdot m^2)$), at room temperature, as well as without adsorber material and without any other coatings, being at least equal to 37.5 meters·Kelvin per Joule ($m \cdot K/J$) To achieve the objective, the invention provides a honeycomb body with channels through which a gas can pass. The inner cross-sectional shape and number of the channels define a specific geometrical surface area ("GSA"), measured in $m^2/l$, of the honeycomb body, and separating walls separate the channels at least partly from one another. The material and thickness of the separating walls define a specific thermal capacity (cp) in relation to the geometrical surface area, measured in $kJ/(K \cdot m^2)$, of the honeycomb body. The honeycomb body further has an adsorber material, in particular, for hydrocarbons, and the specific geometrical surface area (GSA) of the honeycomb body divided by the surface-area-related specific thermal capacity (cp), measured at room temperature and without adsorber material and without any other coatings, is greater than or equal to 37.5 $m \cdot K/J$ (meters·Kelvin/Joule) Preferably, the cp is greater than or equal to 40, and, in particular, greater than or equal to 60.

The thermal capacity of a material is dependent on the temperature of the material and, in the case of exhaust emission control systems, is often considered and specified for relatively high temperature ranges. For functioning as an adsorber, in particular an HC trap, however, the temperature range below 350° C. is decisive, for which reason the figures specified in the present case are related to room temperature, that is 20° C. The specific thermal capacity in the sense defined here is the thermal capacity in relation to a unit of geometrical surface area of the honeycomb body. The unit is a value dependent on the wall thickness and porosity of the separating walls and material.

Previous considerations assumed that an HC trap should not reach the desorption temperature, at which the desorption of hydrocarbons begins, before a downstream catalytic converter has reached a minimum temperature necessary for the catalytic conversion. However, such a consideration does not take into account the fact that, when the necessary minimum temperature is reached, the catalytic conversion brings about the complete conversion of all hydrocarbons very quickly. Such conversion occurs because, even if the catalytic converter reaches the necessary minimum temperature only at one point, the catalytic converter completely heats up further almost abruptly because of the exothermal reaction then taking place. As the converter does so, it catalytically converts all the hydrocarbons flowing onto it. In contrast, the desorption in an HC trap proceeds very slowly. Therefore, even when the desorption temperature is reached and after it is exceeded, the stored hydrocarbon is released only gradually. In contrast with the technical teaching in the past, the realization, found after calculations and tests, leads to an HC trap with as low a thermal capacity as possible and as large a geometrical surface area as possible being preferred. A ratio between the specific geometrical surface area and surface-area-related specific thermal capacity, measured at room temperature and without adsorber material and without any other coatings, of greater than or equal to 40 m·K/J has been found to be favorable. Preferred even still is a larger ratio of greater than or equal to 60. In the case of such a configuration, although the HC trap heats up relatively quickly in the exhaust gas flow during the cold-starting phase, and gradually begins the desorption of hydrocarbons, a downstream catalytic converter can also heat up more quickly. Consequently, the catalytic converter reaches its minimum temperature necessary for the catalytic reaction more quickly, because the HC trap draws increasingly less heat from the exhaust gas flow as it heats up more and more. The consequence has the overall effect that hydrocarbons are converted already at a very early stage in the cold-starting phase and the emission of pollutants can be lowered. The solution according to the invention also has advantages for the dimensioning of an HC trap because rapid kicking off of the catalytic reaction allows a smaller storage volume for the HC trap.

In accordance with another feature of the invention, the sheet metal layers are laminated.

In accordance with a further feature of the invention, the sheet metal layers are wound.

A particularly advantageous aspect of the invention is obtained if the honeycomb body itself additionally has a catalytically active coating, which has at least an oxidizing effect. Then, as soon as the minimum temperature necessary for the oxidation is achieved, the desorbed hydrocarbons can be catalytically converted immediately on the coating. Tests show that the temperature of the honeycomb body rises immediately at the beginning of the conversion due to the exothermal reaction, whereby the desorption process and the conversion are speeded up. This is of advantage, in particular, if a motor vehicle is frequently operated over short distances, because the HC trap is very quickly fully regenerated again and is ready for taking up hydrocarbons during the next cold start.

In the dimensioning of a honeycomb body according to the invention, numerous factors play a role, inter alia, the overall volume of the honeycomb body, the ratio of axial length and cross-sectional surface area, and the placement in the exhaust system. Independently, however, it has been found that an increase in the specific geometrical surface area of the honeycomb body is generally favorable, which can mainly be achieved by increasing the number of channels per unit of cross-sectional surface area. Therefore, honeycomb bodies with over 360 channels per square inch (cpsi) are particularly favorable. Preferably, the bodies have over 450 cpsi and, in particular, over 540 cpsi.

Likewise favorable for a honeycomb body according to the invention is to configure the separating walls such that they have as low a thermal capacity as possible, which can be achieved essentially by reducing the thickness of the separating walls. Therefore, a thickness of less than or equal to 40 $\mu$m is used for honeycomb bodies made of sheet metal layers, preferably, the thickness is less than or equal to 30 $\mu$m. For ceramic honeycomb bodies, by analogy, use of thin-wall ceramic is particularly favorable.

In accordance with a concomitant feature of the invention, there is also provided an exhaust emission control system of a motor vehicle, including at least one three-way catalytic converter, and a hydrocarbon trap honeycomb body according to the invention disposed upstream of the at least one three-way catalytic converter.

A honeycomb body according to the invention is preferably used in an exhaust emission control system of a motor vehicle, to be precise, in conjunction with a downstream three-way catalytic converter. Configurations of conventional exhaust emission control systems may also be of advantage in application of the honeycomb body according to the invention, in particular, a bypass line that can be controlled in dependence on the operating state and/or an electrical heater for heating the honeycomb body or a downstream three-way catalytic converter.

Other features that are considered as characteristic for the invention are set forth in the appended claims.

Although the invention is illustrated and described herein as embodied in a honeycomb body with adsorber material, in particular, for a hydrocarbon trap, it is, nevertheless, not intended to be limited to the details shown since various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWING

The FIGURE is a fragmentary, partially broken away, partially sectional view of the honeycomb body according to the invention.

DESCRIPTION OF THE PREFERRED EMBODIMENTS

Referring now to the single figure of the drawing, it is seen that a honeycomb body 1 according to the invention, serving as an HC trap, has channels 2 that are separated from one another by separating walls 3. Such a honeycomb body 1 may be configured, in particular, in an exhaust system 5 of a motor vehicle. The honeycomb body 1 is disposed upstream of a three-way catalytic converter 4 in an exhaust flow direction. In the cold-starting phase, the exhaust gas, which slowly becomes hotter, initially flows through the honeycomb body 1, with virtually all of the hydrocarbons contained in the exhaust gas being adsorbed by a coating on the separating walls 3 for the adsorption of hydrocarbons, in particular, a zeolite coating. Subsequently, the exhaust gas flows through the three-way catalytic converter 4. Due to the favorable ratio of the geometrical surface area and thermal capacity of the honeycomb body 1 per unit of surface area according to the invention, the time period during which the honeycomb body 1 is already desorbing hydrocarbons, and during which the three-way catalytic converter 4 cannot yet convert them, is very short. The period is followed almost abruptly by a complete conversion of all the hydrocarbons contained and desorbed in the exhaust gas, so that, altogether, the emission of hydrocarbons is less than conventional systems. The process may be further assisted if the honeycomb body 1 additionally has a catalytically active coating, speeding up at least the oxidation.

A honeycomb body according to the invention is suitable in particular for use in exhaust emission control systems of motor vehicles that are to meet the most stringent requirements for environmental compatibility.

We claim:

1. A honeycomb body, comprising:

separating walls defining channels for channelling a gas; and an adsorber material disposed on at least part of said separating walls;

said separating walls being made from a material and having a thickness, said material and said thickness of said separating walls defining a specific thermal capacity in relation to a unit of surface area;

said channels having an inner cross-sectional shape and being separated at least partly from one another by said separating walls, said inner cross-sectional shape and a number of said channels defining a specific geometrical surface area, measured in square meters per liter ($m^2/l$), of the honeycomb body, said geometrical surface area divided by a surface-area-related specific thermal capacity, measured in kilojoules per Kelvin per square meter ($kJ/K \cdot m^2$)), at room temperature, as well as without adsorber material and without any other coatings, being at least equal to 37.5 meters·Kelvin per Joule ($m \cdot K/J$).

2. The honeycomb body according to claim 1, wherein said adsorber material is an adsorber material for hydrocarbons.

3. The honeycomb body according to claim 1, wherein said geometrical surface area is at least equal to 40.

4. The honeycomb body according to claim 1, wherein said geometrical surface area is at least equal to 60.

5. The honeycomb body according to claim 1, wherein said geometrical surface area is substantially equal to 60.

6. The honeycomb body according to claim 1, including a catalytically active coating for providing an oxidizing effect, said coating disposed on at least part of said separating walls.

7. The honeycomb body according to claim 1, wherein a number of said channels is at least equal to 360 per square inch.

8. The honeycomb body according to claim 1, wherein a number of said channels is at least equal to 450 per square inch.

9. The honeycomb body according to claim 1, wherein a number of said channels is at least equal to 540 per square inch.

10. The honeycomb body according to claim 1, wherein a number of said channels is substantially equal to 540 per square inch.

11. The honeycomb body according to claim 1, wherein said separating walls are formed from layers of sheet metal and said thickness of said separating walls is at most equal to 40 $\mu$m.

12. The honeycomb body according to claim 11, wherein said thickness of said separating walls is at most equal to 30 $\mu$m.

13. The honeycomb body according to claim 11, wherein said thickness of said separating walls is substantially equal to 30 $\mu$m.

14. The honeycomb body according to claim 11, wherein said sheet metal layers are laminated.

15. The honeycomb body according to claim 11, wherein said sheet metal layers are wound.

16. An exhaust emission control system of a motor vehicle, comprising:

at least one three-way catalytic converter; and a hydrocarbon trap honeycomb body disposed upstream of said at least one three-way catalytic converter, said honeycomb body having:

separating walls defining channels for channelling a gas; and an adsorber material disposed on at least part of said separating walls;

said separating walls being made from a material and having a thickness, said material and said thickness of said separating walls defining a specific thermal capacity in relation to a unit of surface area;

said channels having an inner cross-sectional shape and being separated at least partly from one another by said separating walls, said inner cross-sectional shape and a number of said channels defining a specific geometrical surface area, measured in square meters per liter ($m^2/l$), of said honeycomb body, said geometrical surface area divided by a surface-area-related specific thermal capacity, measured in kilojoules per Kelvin per square meter ($kJ/(K \cdot m^2)$), at room temperature, as well as without adsorber material and without any other coatings, being at least equal to 37.5 meters·Kelvin per Joule ($m \cdot K/J$).

17. In an exhaust emission control system of a motor vehicle having at least one three-way catalytic converter, a honeycomb comprising:

a hydrocarbon trap honeycomb body disposed upstream of the at least one three-way catalytic converter, said hydrocarbon trap honeycomb body having:

separating walls defining channels for channelling a gas; and an adsorber material disposed on at least part of said separating walls;

said separating walls being made from a material and having a thickness, said material and said thickness of said separating walls defining a specific thermal capacity in relation to a unit of surface area;

said channels having an inner cross-sectional shape and being separated at least partly from one another by said separating walls, said inner cross-sectional shape and a number of said channels defining a specific geometrical surface area, measured in square meters per liter ($m^2/l$) of said honeycomb body, said geometrical surface area divided by a surface-area-related specific thermal capacity, measured in kilojoules per Kelvin per square meter ($kJ/K \cdot m^2$)), at room temperature, as well as without adsorber material and without any other coatings, being at least equal to 37.5 meters·Kelvin per Joule ($m \cdot K/J$).

* * * * *